Figure 1:
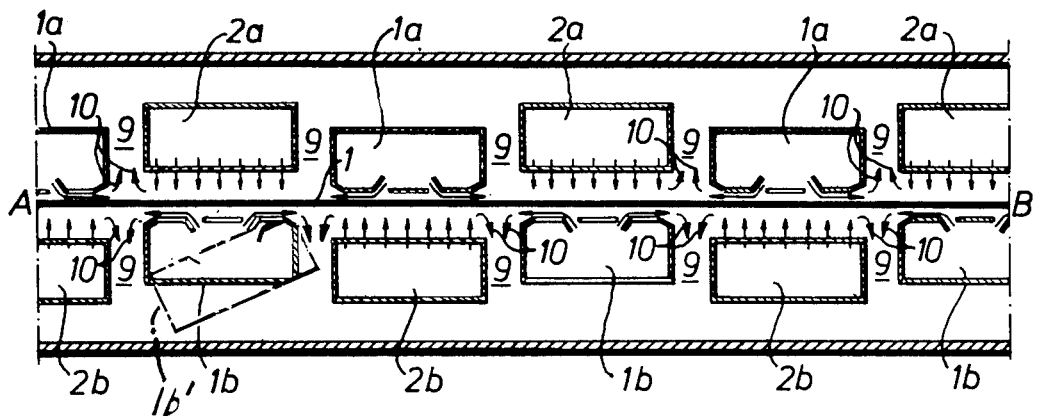

United States Patent [19] [11] 3,982,328
Gustafsson et al. [45] Sept. 28, 1976

[54] DRYER FOR MATERIAL COATED ON TWO SURFACES

[75] Inventors: Rune Gustafsson, Stockholm; Ingemar Karlsson; Rolf Akesson, both of Vaxjo, all of Sweden

[73] Assignee: Aktiebolaget Svenska Flaktfabriken, Nacka, Sweden

[22] Filed: May 28, 1975

[21] Appl. No.: 581,578

[30] Foreign Application Priority Data
May 29, 1974 Sweden ............................ 7407119

[52] U.S. Cl. .................................. 34/156; 34/160; 226/97; 302/31
[51] Int. Cl.² ........................................ F26B 13/20
[58] Field of Search ................... 226/97; 302/29, 31; 34/156, 160

[56] References Cited
UNITED STATES PATENTS

| | | |
|---|---|---|
| 3,070,901 | 1/1963 | Allander et al. .................... 226/97 |
| 3,199,224 | 8/1965 | Brown .................................. 34/156 |
| 3,231,165 | 1/1966 | Wallin et al. ......................... 226/97 |
| 3,559,301 | 2/1971 | Fraser .................................. 34/156 |
| 3,622,058 | 11/1971 | Vits ...................................... 302/31 |
| 3,837,551 | 9/1974 | Schregenberger ................... 34/156 |

Primary Examiner—John J. Camby
Assistant Examiner—Larry I. Schwartz
Attorney, Agent, or Firm—Dorfman, Herrell and Skillman

[57] ABSTRACT

Web or sheet material is carried on air to advance the material in a fixed stable floating position through one or more decks of a treating plant, preferably a drier. Fixing chambers providing an air flow substantially parallel to the plane of the material and blow boxes with an air flow substantial perpendicular to said plane of the material are located adjacent each other on both sides of the material and are arranged to face each other mutually on the opposite sides of the plane of the material.

5 Claims, 3 Drawing Figures

DRYER FOR MATERIAL COATED ON TWO SURFACES

This invention relates to an arrangement at the treatment of web or sheet material carried by means of air to advance the material in a fixed stable floating position without flutter through one or more decks of a treating plant, preferably a drier, to dry a double-coated material web consisting, for example, of paper, film, plastic foil, in such a manner, that the air is supplied from a plurality of blow boxes distributed along the conveying path of the web and provided with apertures for outflow of the air against the material, and thereafter is removed through a plurality of tap apertures provided in the blow boxes or adjacent thereto.

It is known to treat a material web, for example of paper, carried by means of air by blowing hot air from both sides perpendicularly against the web. The disadvantage of this method was found to be that the air treatment and support effect applied must be restricted to relatively low values, which results in a low evaporation intensity due to the fact, that the paper web otherwise would swing forcefully between the air distribution means, which would give rise to unstable web movement and imply the risk of web contact with said distribution means whereby the coated surface would be damaged. The present invention, however, permits a high air treatment and support effect on both sides and therewith a high and identically equal evaporation intensity on both sides, with maintained stable web movement free of contact.

The arrangement according to the invention is primarily characterized in that the web on each deck of the treating plant is passed between two blow box planes, each of which is built up of a combination of blow boxes designed for blowing perpendicularly against the web from a plurality of apertures for the air distributed over the plane of the blow boxes, with blow boxes designed as fixing chambers for air ejection in parallel with the material web to fix the same — by means of the known Bernoulli and Coanda effects — and so disposed that a fixing chamber on one side of the web is located directly in front of a blow box for perpendicular blowing located on the opposite side of the material web, and a blow box disposed on the one side adjacent a fixing chamber is located directly in front of a fixing chamber on the opposite side mounted between two blow boxes.

Further characterizing features become apparent from the following description and claims.

The invention is described in greater detail, with reference to the accompanying drawing, in which FIG. 1 is a cross-section through the arrangement comprising blow boxes for substantially perpendicular blowing of air against the web alternating with blow boxes for ejection of air in parallel with the material web and disposed on the same side of the material, as well as blow boxes for ejection of air in parallel with the material web and blow boxes for blowing air substantially perpendicularly against the web mounted on the opposite side of the material web directly in front of the first mentioned ones.

Figure 1A:
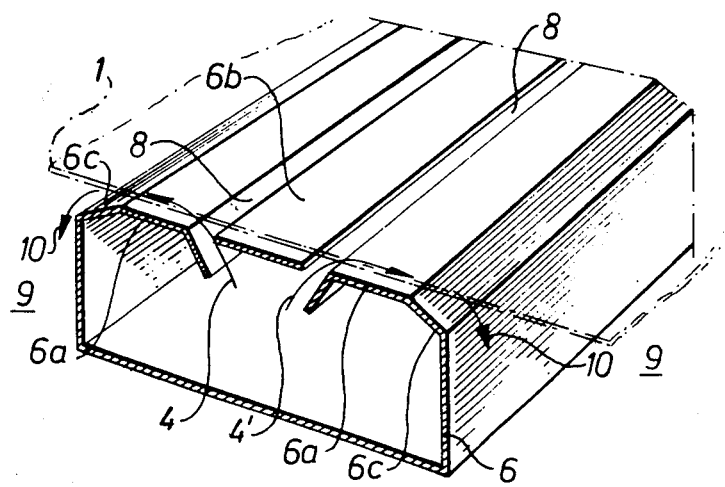
Figure 1B:
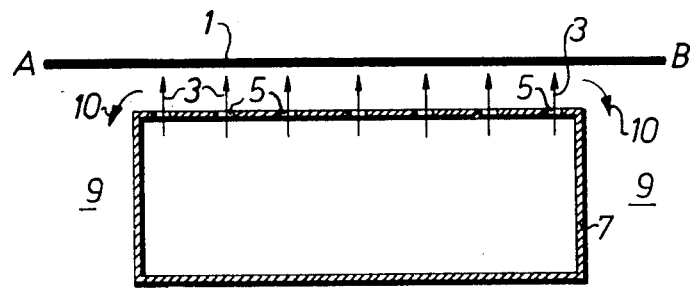

FIG. 1A is a perspective view on an enlarged scale of a blow box designed according to U.S. Pat. No. 3,231,165 i.e. a blow box with apertures for air outflow in parallel with the material web, and FIG. 1B is a cross-section on an enlarged scale through a blow box designed according to U.S. Pat. No. 2,678,237 i.e. a blow box with apertures for air outflow substantially perpendicularly to the material web.

In FIG. 1 a number of fixing chambers, i.e. blow boxes designed for air ejection in parallel with the material web and disposed over the material web 1, are designated by 1a, and a number of fixing chambers disposed beneath the material web are designated by 1b. In a corresponding way, 2a designates a number of blow boxes designed for perpendicular blowing onto the material web and disposed above the same, while 2b designates corresponding blow boxes attached beneath the material web. The blow boxes 2a alternate with the fixing chambers 1a on the upper side of the material web, and in a corresponding way the blow boxes 2b alternate with the fixing chambers 1b on the lower side of the material web. According to the invention, the fixing chambers are located directly in front of the blow boxes along the entire extension of the material web. The intermediate space between blow boxes and fixing chambers is designated by 9. This intermediate space is presupposed to communicate, in a manner not shown, with the suction side of one or more fans, while the pressure side of the fan or fans is connected to the interior of the blow boxes and, respectively, fixing the chambers. In a preferred embodiment, means is provided to independently control the air flow from the respective blow boxes and fixing chambers.

In FIG. 1A, the numerals 4, 4' designate air jets ejected obliquely and flowing in parallel both with the conveying direction, as in the embodiment shown, and against the conveying direction A-B. 6 designates the casing of the pressure chamber with two plane top portions 6a separated by a central portion 6b to produce two slot-shaped outflow apertures. Instead of being coherently slot-shaped, the outflow apertures, as shown for example in FIG. 1 in the U.S. Pat. No. 3,231,165, may be a plurality of eyelid perforations disposed in one row. 6c designates chamfered edges of the pressure chamber sides facing toward the intermediate space 9, and 10 designates the direction for the return air into said intermediate space. The web position is thus fixed by means of the known Bernoulli and Coanda effects.

In FIG. 1B the numeral 7 designates the casing of the blow box, and 5 designates a plurality of apertures designed for substantially perpendicular blowing of air jets 3 against the material web 1. Each row of such apertures may, as is known in this art, be replaced by a corresponding slot designed for substantially perpendicular blowing of a coherent wide air jet against the material web. 9 designates the aforesaid intermediate space between a blow box and an adjacent fixing chamber.

The fixing chambers 1a and 1b have their apertured surfaces disposed at a distance between −10 and +30 mm from the longitudinal center plane of web path. All of the fixing chambers have such surfaces in a common plane at each side of the web. However, during the threading operation, one edge of the fixing chamber may be lifted or lowered, for example as shown at 1b' in FIG. 1 to facilitate threading.

We claim:

1. An apparatus for the treatment of web or sheet material carried by means of air to advance the material in a fixed stable floating position without flutter in a conveying path through one or more decks of a treating plant to dry a double-coated material web, consisting of air supply means comprising a plurality of treatment blow boxes and fixing-chamber blow boxes distributed along the conveying path of the web and provided with apertures for outflow of the air against the material, and air exhaust means comprising a plurality of tap apertures provided in or adjacent the blow boxes, characterized in that the web path on each deck of the treating plant is between two blow box series respectively parallel to said path, the series being built up of a combination of a number of treatment blow boxes having a plurality of apertures for the air distributed over the plane of the blow box for blowing air perpendicularly against the web path, with an equal number of blow boxes designated as fixing chambers having apertures for air ejection in parallel with the material web path to fix the material, said series being disposed so that each fixing chamber blow box on one side of the web path faces a treatment blow box on the opposite side of the material web path, and each treatment blow box on the one side of the web path faces a fixing chamber mounted on the opposite side of the web path, the treatment boxes alternating with the fixing chambers in each of said blow box series.

2. An apparatus as defined in claim 1, characterized in that the fixing chambers have their apertured surfaces facing toward the web at the distance −10 mm to +30 mm from the longitudinal center plane of the conveying path.

3. An apparatus as defined in claim 1, characterized in that the fixing chambers have their apertured surfaces facing toward the web in the same plane, on each side of the conveyance path.

4. An apparatus as defined in claim 1, characterized in that the fixing chambers and the blow boxes are provided with means for controlling the air flow therefrom independently of each other to control the drying effect on opposite sides of the web.

5. An apparatus as defined in claim 1, characterized in that at least the fixing chambers are movable and supported on the drive side so that at least one edge of the fixing chamber can be lifted and, respectively, lowered for threading the lead portion of the web.

* * * * *